(12) United States Patent
Shiraishi

(10) Patent No.: US 10,866,534 B1
(45) Date of Patent: Dec. 15, 2020

(54) OPTICAL DEVICE AND IMAGE FORMING APPARATUS

(71) Applicant: TOSHIBA TEC KABUSHIKI KAISHA, Tokyo (JP)

(72) Inventor: Takashi Shiraishi, Kawasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/570,542

(22) Filed: Sep. 13, 2019

(51) Int. Cl.
| G03G 15/00 | (2006.01) |
| G03G 15/04 | (2006.01) |
| G02B 17/08 | (2006.01) |
| G02B 3/00 | (2006.01) |
| G02B 17/00 | (2006.01) |

(52) U.S. Cl.
CPC ....... G03G 15/04036 (2013.01); G02B 3/005 (2013.01); G02B 17/002 (2013.01); G02B 17/08 (2013.01)

(58) Field of Classification Search
CPC .......... G03G 15/00; G03G 15/04; G02B 3/05; G02B 6/4215; G02B 17/002; G02B 17/08; G02B 19/0028; G02B 19/0057; H04N 1/024; H04N 1/00278; H04N 1/028

USPC ... 399/1, 3–5, 177, 196–202, 218, 220, 221; 358/474, 475, 486, 501, 509; 382/167, 382/275
See application file for complete search history.

(56) References Cited

U.S. PATENT DOCUMENTS

| 4,576,462 A * | 3/1986 | Lehman ............... G03B 27/542 |
| | | 355/70 |
| 9,213,290 B2 * | 12/2015 | Koyama ................. H04N 1/50 |
| 2014/0204430 A1 | 7/2014 | Shiraishi |
| 2016/0216634 A1 | 7/2016 | Shiraishi |
| 2017/0351194 A1 | 12/2017 | Shiraishi |

* cited by examiner

Primary Examiner — Hoan H Tran
(74) Attorney, Agent, or Firm — Kim & Stewart LLP

(57) ABSTRACT

An optical device includes a plurality of light sources each configured to emit light having a different wavelength, and a lens mirror array in which a plurality of optical elements is arrayed, each of the plurality of optical elements including an incident surface through which the light emitted from each light source enters the optical element, a first reflection surface from which the light incident on the incident surface is reflected, a second reflection surface from which the light reflected by the first reflection surface is further reflected, and an emission surface through which the light reflected by the second reflection surface exits the optical element. The plurality of light sources is arranged such that a light source that emits light having a shorter wavelength is disposed farther from the second reflection surface.

20 Claims, 12 Drawing Sheets

FIG. 2
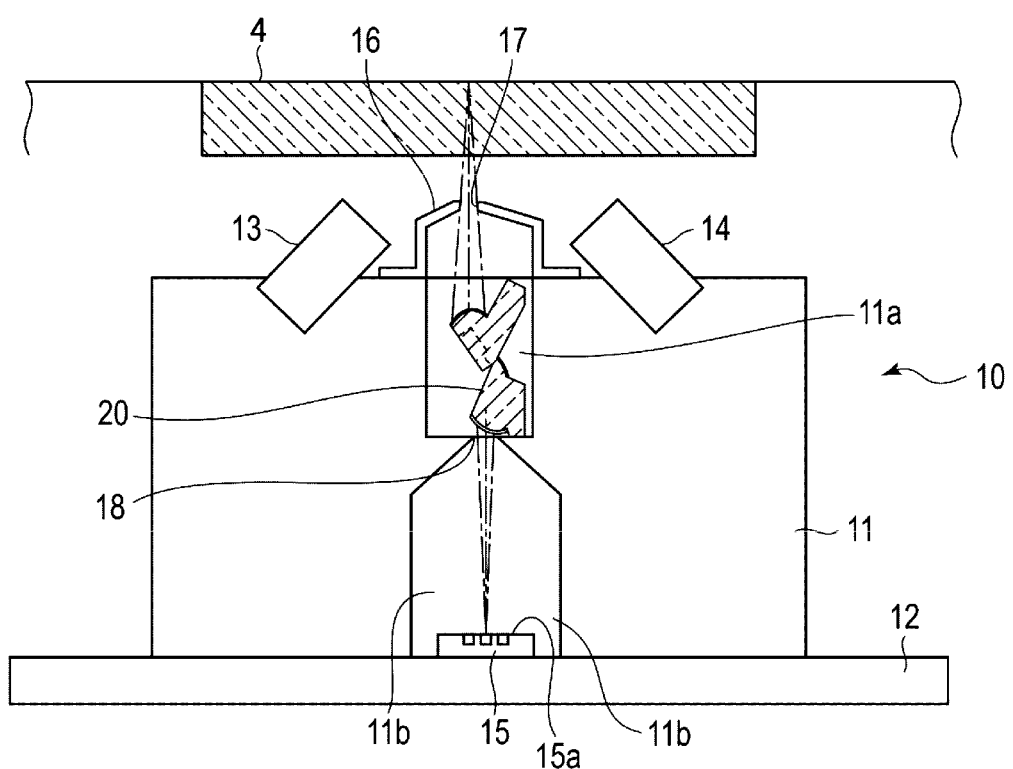
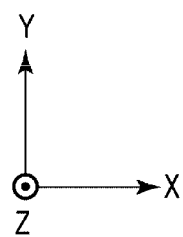

FIG. 3
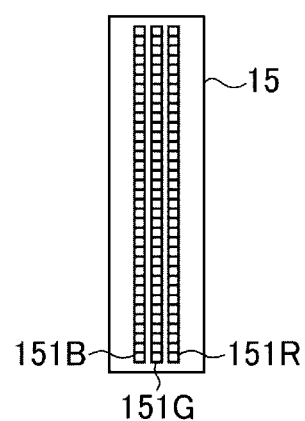
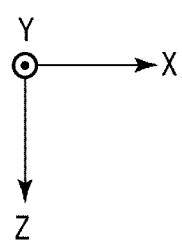

FIG. 5
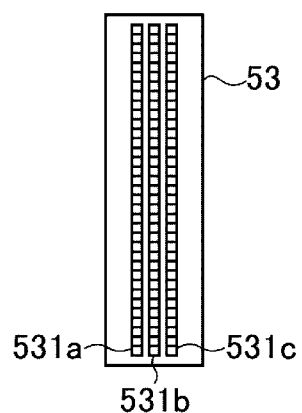
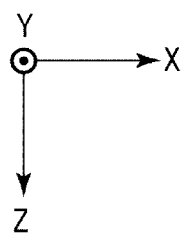

US 10,866,534 B1

OPTICAL DEVICE AND IMAGE FORMING APPARATUS

FIELD

Embodiments described herein relate generally to an optical device and an image forming apparatus.

BACKGROUND

In recent years, an LED (light emitting diode) printer of a solid-state scanning type including an exposure optical system in which a plurality of semiconductor light emitting elements are used as light sources is becoming popular. The exposing device of such an LED printer includes a light source having multiple rows of LEDs arranged in the axial direction of a photoconductive drum, that are separated from one another in the rotating direction of the photoconductive drum. The exposing device includes a lens mirror array that refracts and reflects lights based on image signals emitted from the LEDs of the light source and condenses the lights on the surface of the photoconductive drum.

The lens mirror array includes a plurality of optical elements arranged in the axial direction of the photoconductive drum. The optical elements condense the lights from the LEDs of the light source on the surface of the photoconductive drum. For example, the lens mirror array is formed of transparent resin. Each of the optical elements is connected in the axial direction.

One optical element of the lens mirror array includes an incident-side lens surface on which light from the light source is incident and an emission-side lens surface from which the light made incident via the incident-side lens surface is emitted toward the surface of the photoconductive drum. The optical element has a plurality of reflection surfaces that reflect the light incident via the incident-side lens surface toward the emission-side lens surface.

At least one of the plurality of reflection surfaces functions as a relay lens for forming, in cooperation with the incident-side lens surface and the emission-side lens surface, on the surface of the photoconductive drum, an image point conjugate with an object point on the light source side. That is, the optical elements have an optical characteristic for focusing the light from the light source on the surface of the photoconductive drum.

DESCRIPTION OF THE DRAWINGS

FIG. 2 is a schematic diagram illustrating a document reading device illustrated in FIG. 1;

FIG. 3 is a top view illustrating an image sensor illustrated in FIG. 2;

FIG. 5 is a top view a light source illustrated in FIG. 4;

DETAILED DESCRIPTION

Figure 1:
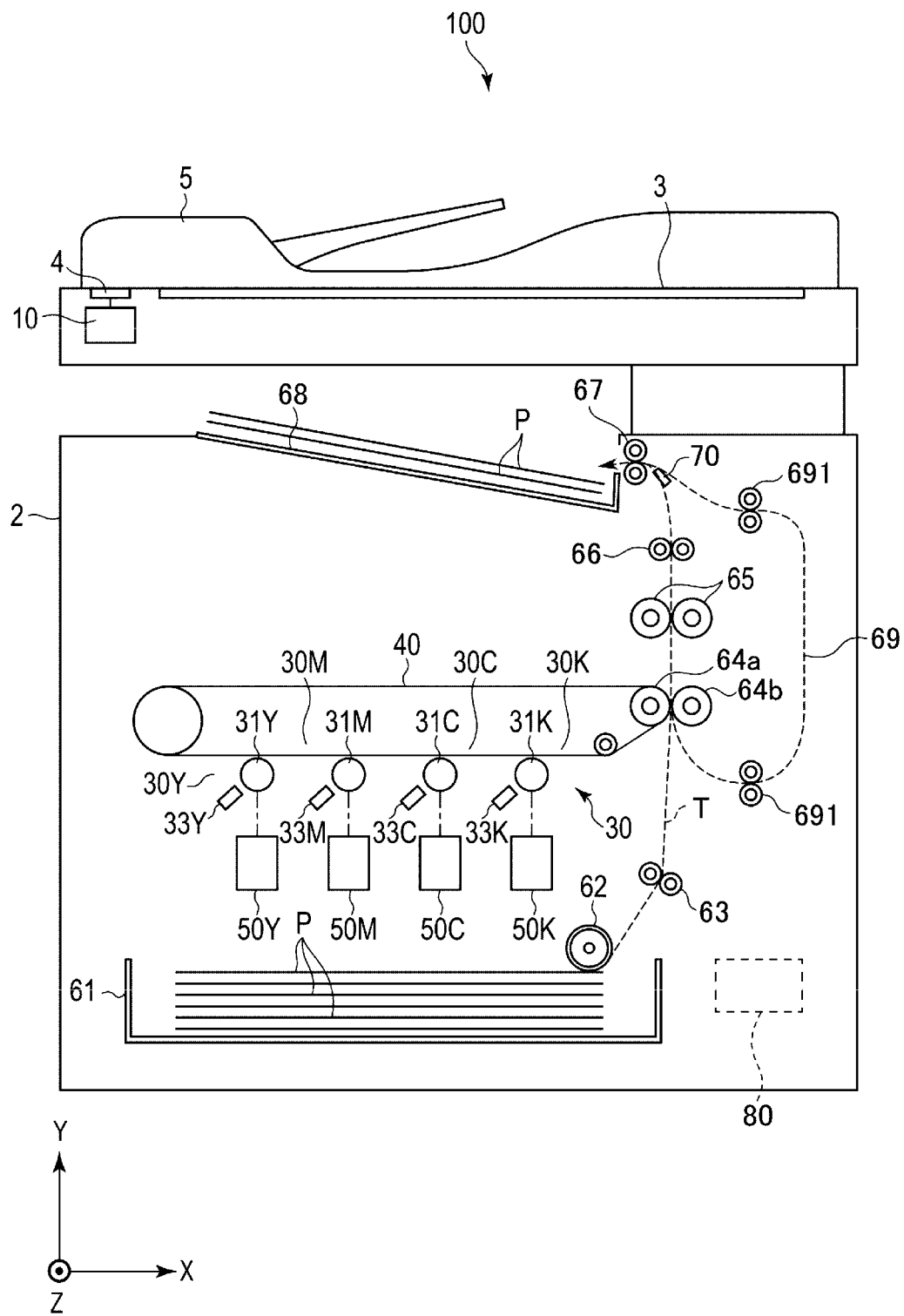
FIG. 1 is a schematic diagram illustrating an image forming apparatus according to one embodiment.

An optical device according to an embodiment includes a plurality of light sources each configured to emit light having a different wavelength, and a lens mirror array in which a plurality of optical elements is arrayed, each of the plurality of optical elements including an incident surface through which the light emitted from each light source enters the optical element, a first reflection surface from which the light incident on the incident surface is reflected, a second reflection surface from which the light reflected by the first reflection surface is further reflected, and an emission surface through which the light reflected by the second reflection surface exits the optical element. The plurality of light sources is arranged such that a light source that emits light having a shorter wavelength is disposed farther from the second reflection surface.

An image forming apparatus according to an embodiment is explained with reference to the drawings. In the drawings, different scale sizes may be used as appropriate, and the structure of each component may be simplified for the purpose of illustration. In the drawings and the following explanation, the same signs indicate the same elements.

The image forming apparatus 100 is explained with reference to FIG. 1. The copying machine 100 is, for example, an LED copying machine of a solid-state scanning type including an exposure optical system in which a semiconductor light emitting element such as an LED is used as a light source. In the following explanation, the left-right direction of the image forming apparatus 100 is represented as X direction, the up-down direction of the image forming apparatus 100 is represented as Y direction, and the front-rear direction of the image forming apparatus 100 is represented as Z direction. In the figures, the X direction is indicated by an arrow X, the Y direction is indicated by an arrow Y, and the Z direction is indicated by an arrow Z.

The image forming apparatus 100 includes a housing 2, a document table glass 3, a reading glass 4, and a document feeding device 5.

The housing 2 houses and holds each component of the image forming apparatus 100. The document table glass 3 and the reading glass 4 are provided on the upper surface of the housing 2. The document feeding device 5 is attached above the housing 2 to cover the document table glass 3 and the reading glass 4.

The document table glass 3 is a table for placing a document.

The document is conveyed by the document feeding device 5 above the reading glass 4.

The document table glass 3 and the reading glass 4 are, for example, transparent plates made of glass or resin. A document reading device 10 is provided below the document table glass 3 and the reading glass 4. Light reflected on the document present on the document table glass 3 or the reading glass 4 enters the document reading device 10 through the document table glass 3.

The document feeding device 5 is called ADF (auto document feeder) or the like as well. The document feeding device 5 includes a tray for holding the document. The document feeding device 5 conveys the document placed on the tray to pass above the reading glass 4. The document feeding device 5 is configured to open and close. In the image forming apparatus 100, if the document feeding device 5 is in the open state, the document can be placed on the document table glass 3. The document is placed on the document table glass 3 such that the document surface on which an image is printed, faces the document table glass 3. If the document feeding device 5 is in the closed state, the document feeding device 5 functions as a document presser for pressing the document against the document table glass 3.

The document reading device 10 is explained with reference to FIG. 2. The document reading device 10 casts scanning light toward a document and converts the reflected light into an image signal with an image sensor 15 explained below. Consequently, the document reading device 10 acquires a digital image of the document. The document reading device 10 is capable of moving, with a driving mechanism, in the left-right direction (i.e., the X direction) in FIG. 2 along the document table glass 3 and the reading glass 4. The document reading device 10 is capable of coming to a standstill below the reading glass 4. The document reading device 10 illustrated in FIGS. 1 and 2 is in a standstill state below the reading glass 4. As an example, the document reading device 10 includes, as illustrated in FIG. 2, a supporting body 11, a substrate 12, an illumination device 13, an illumination device 14, an image sensor 15, a light blocking member 16, and a lens mirror array 20.

The supporting body 11 has a rectangular block shape. The supporting body 11 is extended in the Z direction orthogonal to a paper surface parallel to a rotation axis of a photoconductive drum explained below. The supporting body 11 supports the substrate 12, the illumination device 13, the illumination device 14, the image sensor 15, the light blocking member 16, and the lens mirror array 20. The supporting body 11 is disposed on the substrate 12.

The substrate 12 is extended in the Z direction orthogonal to the paper surface. The substrate 12 is a circuit board including a circuit that executes various kinds of processing concerning an image signal. The circuit of the substrate 12 reads out an image signal from the image sensor 15. The circuit of the substrate 12 performs signal processing on the image signal and acquires a digital image (i.e., image data). The circuit of the substrate 12 includes a memory that temporarily stores the image.

The two illumination devices 13 and 14 are provided on an upper surface on the document table glass 3 side (i.e., the reading glass 4 side) of the supporting body 11. The illumination devices 13 and 14 are extended in the Z direction and provided to be separated from each other in the left-right direction (i.e., the X direction) in FIG. 2. The illumination devices 13 and 14 move in the X direction together with the supporting body 11 and illuminate the surface of a document placed on the document table glass 3. The illumination devices 13 and 14 illuminate the document surface passing above the reading glass 4. The illumination devices 13 and 14 are attached to the supporting body 11 in an inclined posture in which illumination lights of the illumination devices 13 and 14 travel toward a reading region of the document.

For example, the illumination devices 13 and 14 include light sources in which pluralities of LED elements are arranged in the Z direction orthogonal to the paper surface and include light guide bodies extended in the Z direction. As the illumination devices 13 and 14, besides the above, a fluorescent tube, a Xenon tube, an organic EL (electroluminescence) element, or the like extended in the Z direction can be used.

The image sensor 15 is, for example, a line sensor in which a plurality of imaging elements that convert light into an image signal are linearly arrayed. The image signal is, for example, an electric signal. The plurality of imaging elements of the image sensor 15 are linearly arrayed side by side in the Z direction. The image sensor 15 is, for example, a CCD (charge-coupled device) image sensor, a CMOS (complementary metal-oxide-semiconductor) image sensor, or another image sensor.

FIG. 3 is a top view of the image sensor 15. As illustrated in FIG. 3, the image sensor 15 includes three line sensors 151, that is, a line sensor 151R, a line sensor 151G, and a line sensor 151B. Each of the three line sensors 151 converts strength and weakness of light corresponding to one of the three primary colors in additive mixing into a signal. That is, the line sensors 151 detect lights having different wavelengths. The three primary colors are, for example, RGB (i.e., red, green, and blue). Therefore, the line sensor 151R converts strength and weakness of incident red light into a signal. The line sensor 151G converts strength and weakness of incident green light into a signal. The line sensor 151B converts strength and weakness of incident blue light into a signal. The three line sensors 151 are arranged from the left direction to the right direction (i.e., in the X direction) in FIG. 3 in ascending order of wavelengths of lights corresponding to the three line sensors 151. A magnitude relation of the wavelengths of the lights is blue<green<red. Therefore, the three line sensors 151 are arranged in the order of the line sensor 151B, the line sensor 151G, and the line sensor 151R from left to right in FIG. 3. The line sensors 151 are an example of the optical sensor that detects light. Alternatively, the imaging elements configuring the line sensors 151 are an example of the optical sensor that detects light.

Referring back to FIG. 2, the light blocking member 16 is attached to the upper surface of the supporting body 11. The light blocking member 16 is extended in the Z direction and includes a slit 17 that causes reflected light from the document surface to pass and guides the reflected light to the lens mirror array 20. The light blocking member 16 has structure obtained by bending a long rectangular plate along the longitudinal direction. A light blocking material is applied to the surface of the light blocking member 16. The slit 17 of the light blocking member 16 prevents light other than the reflected light that comes from a predetermined range of the document surface from being incident on the lens mirror array 20.

The supporting body 11 includes a slit 18 extending in the Z direction on the image sensor 15 side of the lens mirror array 20. The supporting body 11 includes a chamber 11a in which the lens mirror array 20 is housed and disposed and a chamber 11b in which the image sensor 15 is housed and disposed. The slit 18 is provided between the chambers 11a and 11b. The slit 18 has width for allowing reflected light from the document to pass and blocks unnecessary light to be a noise component (i.e., noise light).

The supporting body 11 supports the lens mirror array 20 near the upper surface of the supporting body 11 and between the two illumination devices 13 and 14. The lens mirror array 20 is extended in the Z direction and functions to form, on a light reception surface 15a of the image sensor 15 mounted on the substrate 12, an erected image of the image formed on the document surface. The lens mirror array 20 is explained in detail below.

For example, if a document is conveyed by the document feeding device 5 in a state in which the document reading device 10 is at a standstill under the reading glass 4, a document surface is illuminated by the illumination devices 13 and 14 via the reading glass 4. Reflected light from the document surface is incident on the lens mirror array 20 via the slit 17 of the light blocking member 16. The lens mirror array 20 reflects and condenses the reflected light from the document surface as explained below and emits the reflected light toward the image sensor 15 via the slit 18. The image sensor 15 receives the reflected light from the document surface, photoelectrically converts the reflected light, and outputs an image signal.

At this time, the erected image formed on the image sensor 15 by the lens mirror array 20 of the document passing on the reading glass 4 according to the operation of the document feeding device 5 is read line by line along the Z direction. The document passes the reading glass 4 in the X direction, whereby an image of the entire document surface (i.e., for a plurality of lines) can be acquired. Alternatively, if an document is set on the document table glass 3 and the document reading device 10 is moved in the X direction along the document table glass 3, similarly, an erected image on the document surface formed on the image sensor 15 by the lens mirror array 20 is read line by line along the Z direction. An image of the entire document surface can be acquired.

Referring back to FIG. 1, the image forming apparatus 100 includes, in the housing 2, image forming sections 30, an intermediate transfer belt 40, exposing devices 50, a paper feeding cassette 61, a pickup roller 62, a conveying roller 63, secondary transfer rollers 64, a fixing unit 65, a conveying roller 66, a paper discharging roller 67, a reversing unit 69, a conveyance guide 70, and a controller 80. A paper discharge tray 68 is provided in the housing 2.

The image forming apparatus 100 includes one or more image forming sections 30. As an example, the image forming apparatus 100 includes, as illustrated in FIG. 1, four image forming sections 30, that is, a yellow-image forming unit 30Y, a magenta-image forming unit 30M, a cyan-image forming unit 30C, and a black-image forming unit 30K along a traveling direction of the intermediate transfer belt 40 (i.e., the X direction). The yellow-image forming unit 30Y, the magenta-image forming unit 30M, the cyan-image forming unit 30C, and the black-image forming unit 30K form images with toners corresponding to color components of CMYK (cyan, magenta, yellow, and key (black)), respectively.

Figure 4:
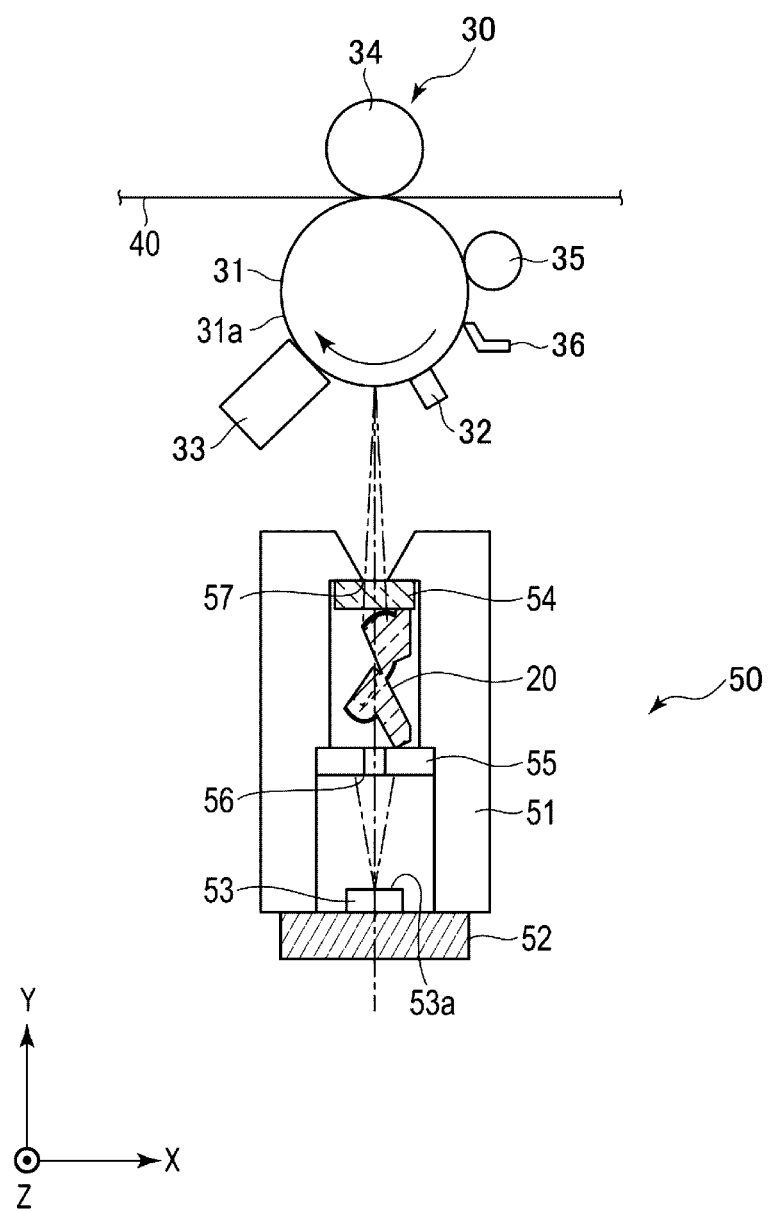
FIG. 4 is a schematic diagram illustrating an image forming unit and an exposing device illustrated in FIG. 1.

The image forming unit 30 and the exposing device 50 are explained with reference to FIG. 4. FIG. 4 is a schematic diagram of the image forming unit 30 and the exposing device 50 and a peripheral structure of the image forming unit 30 and the exposing device 50. The image forming unit 30 includes, for example, a photoconductive drum 31, an electrifying charger 32, a developing device 33, a primary transfer roller 34, a cleaner 35, and a blade 36.

The photoconductive drum 31 has a rotation axis extending in the Z direction. The photoconductive drum 31 is rotatably disposed with the outer circumferential surface of the photoconductive drum 31 set in contact with the surface of the intermediate transfer belt 40. The primary transfer roller 34 is provided on the inner side of the intermediate transfer belt 40 opposed to the photoconductive drum 31. The photoconductive drum 31 is rotated by a driving mechanism in an arrow direction illustrated in FIG. 4 (i.e., the clockwise direction) at the same peripheral speed as the peripheral speed of the intermediate transfer belt 40.

The electrifying charger 32 uniformly charges the surface 31a of the photoconductive drum 31.

The exposing device 50 irradiates exposure light based on an image signal of a color component corresponding to the exposing device 50 onto the surface of the photoconductive drum 31. Consequently, the exposing device 50 forms an electrostatic latent image based on the image signal of the corresponding color component on the surface 31a of the photoconductive drum 31.

The exposing devices 50 corresponding to the colors are referred to as exposing device 50Y, exposing device 50M, exposing device 50C, and exposing device 50K.

The developing device 33 supplies toner of the corresponding color to the electrostatic latent image formed on the surface 31a of the photoconductive drum 31. Consequently, the developer 33 forms a toner image by the toner on the surface 31a of the photoconductive drum 31.

The primary transfer roller 34 generates a transfer voltage between the primary transfer roller 34 and the photoconductive drum 31. Consequently, the primary transfer roller 34 transfers the toner image formed on the surface 31a of the photoconductive drum 31 onto the intermediate transfer belt 40. At this time, the primary transfer rollers 34 of the colors superimpose toner images of the colors and transfer the toner images onto the intermediate transfer belt 40.

The cleaner 35 and the blade 36 remove the toner remaining on the surface 31a of the photoconductive drum 31.

The exposing device 50 is attached to, for example, a position opposed to the photoconductive drum 31 and vertically downwardly. As an example, the exposing device 50 includes the lens mirror array 20, a supporting body 51, a substrate 52, a light source 53, a protective glass 54, and a light blocking body 55.

The supporting body 51 has a rectangular block shape. The supporting body 51 extends in the Z direction parallel to the rotation axis of the photoconductive drum 31 and orthogonal to the paper surface and is located at a position separated from the photoconductive drum 31 and opposed to the photoconductive drum 31 downwardly in FIG. 4. The supporting body 51 supports the lens mirror array 20, the substrate 52, the light source 53, the protective glass 54, and the light blocking body 55.

The supporting body 51 supports the lens mirror array 20 having the same structure as the structure of the lens mirror array 20 of the document reading device 10 explained above. The lens mirror array 20 of the exposing device 50 is attached to the supporting body 51 in the direction opposite to the direction of the lens mirror array 20 of the document reading device 10. The lens mirror array 20 is extended in the Z direction, reflects and condenses light incident from the light source 53 as explained below, and emits the light toward the surface 31a of the photoconductive drum 31.

The substrate 52 is a circuit board mounted with the light source 53, a driving circuit that drives the light source 53, and the like.

The light source 53 is, for example, a light source in which a plurality of semiconductor light emitting elements are arranged in the Z direction and linearly mounted on the surface of the substrate 52. A plurality of rows of the semiconductor light emitting elements are arranged and provided along a rotating direction of the photoconductive drum 31.

FIG. 5 is a top view of the light source 53. As illustrated in FIG. 5, the light source 53 includes a plurality of light source rows 531, which are rows of semiconductor light emitting elements. As an example, the light source 53 includes three light source rows 531, that is, a light source row 531a, a light source row 531b, and a light source row 531c. The light source rows 531 emit, for example, lights having different wavelengths. If the light source rows 531 are arranged in ascending order of the wavelengths of the emitted lights, the light source rows 531 are arranged in the order of the light source row 531a, the light source row 531b, and the light source row 531c. That is, the three light source rows 531 are arranged from left to right in FIG. 5 (i.e., in the X direction) in ascending order of the wavelengths of the lights corresponding to the light source rows 531.

The light source 53 emits light based on image data (i.e.; an image signal) of a color component corresponding to the light source 53 among color components obtained by decomposing image data acquired by the document reading device 10 or image data acquired via an external device such as a PC (personal computer). The plurality of semiconductor light emitting elements of the light source 53 are, for example, LEDs or OLEDs (organic light emitting diodes) that are turned on and off based on the image data.

The protective glass 54 is provided between the lens mirror array 20 and the photoconductive drum 31. The protective glass 54 is transparent glass, transparent resin, or the like. The protective glass 54 prevents toner, dust, and the like from adhering to the lens mirror array 20. One end of the lens mirror array 20 is butted against the protective glass 54 and positioned. The protective glass 54 is extended in the Z direction.

The light blocking body 55 is provided between the lens mirror array 20 and the light source 53. The light blocking body 55 is extended in the Z direction and includes a slit 56 extending in the Z direction. For example, a light blocking material is applied to the surface of the light blocking body 55. The light blocking body 55 blocks a part of light emitted from the light source 53. For example, the light blocking body 55 blocks light passing a position with a predetermined distance or more apart from the optical axis of the light emitted from the light source 53.

The supporting body 51 includes a slit 57 extending in the Z direction on an emission side of light of the protective glass 54. The slit 57 has width for allowing a light component necessary for exposure to pass and blocks noise light unnecessary for exposure.

The light emitted from the light source 53 passes through the slit 56 of the light blocking body 55 and is incident on the lens mirror array 20. The lens mirror array 20 reflects and condenses the light from the light source 53 and emits the light. The light emitted from the lens mirror array 20 is condensed on the surface 31a of the rotating photoconductive drum 31 via the protective glass 54 and the slit 57.

At this time, an electrostatic latent image is formed on the surface 31a of the photoconductive drum 31 line by line along the Z direction according to the rotation of the photoconductive drum 31. If the photoconductive drum 31 rotates a fixed amount, electrostatic latent images of color components corresponding to the entire image of the original document are formed on the surface 31a of the photoconductive drum 31.

Referring back to FIG. 1, the paper feeding cassette 61 is provided near the lower end in the housing 2 of the image forming apparatus 100 to be capable of being drawn out from the front surface of the housing 2. The paper feeding cassette can store a plurality of stacked sheets P having a predetermined size.

The pickup roller 62 is disposed above the right end in FIG. 1 of the paper feeding cassette 61. The pickup roller 62 rotates with the circumferential surface of the pickup roller 62 set in contact with the sheet P to pickup the sheets P present at the top one by one among the sheets P stacked and stored in the paper feeding cassette 61. The sheet P picked up by the pickup roller 62 is conveyed along a conveying path T. The conveying path T is a path on which the sheet P is conveyed. The conveying path T passes the pickup roller 62, the conveying roller 63, the secondary transfer rollers 64, the fixing unit 65, and the paper discharging roller 67 and reaches the paper discharge tray 68.

The conveying roller 63 conveys the sheet P picked up by the pickup roller 62 to the secondary transfer rollers 64.

The image forming apparatus 100 includes a pair of secondary transfer rollers 64. The secondary transfer rollers 64 generate a transfer voltage to thereby transfer toner images of the colors, which are superimposed and transferred onto the surface of the intermediate transfer belt 40, onto the sheet P passing between the secondary transfer rollers 64 and the intermediate transfer belt 40. One secondary transfer roller 64a is disposed on the inner side of the intermediate transfer belt 40. The intermediate transfer belt 40 is wound around the secondary transfer roller 64a. The other secondary transfer roller 64b is opposed to the secondary transfer roller 64a across the intermediate transfer belt 40. The toner images of the colors superimposed and transferred onto the surface of the intermediate transfer belt 40 are fed into between the two secondary transfer rollers 64 according to traveling of the intermediate transfer belt 40.

The fixing unit 65 is disposed on the conveying path T on the downstream side of the secondary transfer rollers 64 (i.e., the upper side in FIG. 1). As an example, the fixing unit 65 includes a heater that heats the sheet p and a pressurizing roller that pressurizes the sheet P. The fixing unit 65 heats and pressurizes the sheet P conveyed via the conveying path T and fixes the toner images, which are transferred onto the surface of the sheet P, on the surface of the sheet P. An image is formed on the sheet P as explained above.

The conveying roller 66 conveys the sheet P heated and pressurized by the fixing unit 65 to the paper discharging roller 67.

The paper discharging roller 67 discharges the sheet P, on which the image is formed, to the paper discharge tray 68. The paper discharging roller 67 can rotate in both of regular and reverse directions.

The paper discharge tray 68 is provided above the housing 2 and below the document table glass 3. The sheet P, on which the image is formed, is discharged to the paper discharge tray 68 from the inside of the housing 2.

The reversing unit 69 reverses the sheet P, on one surface of which the image is formed, and feeds the sheet P into a nip of the secondary transfer rollers 64. The reversing unit 69 includes a plurality of conveying rollers 691, which hold the sheet P and rotate to convey the sheet P, and a conveyance guide. For example, the reversing unit 69 switches back the sheet P to reverse the sheet P.

The conveyance guide 70 is provided on the upstream side of the paper discharging roller 67. The conveyance guide 70 switches a conveyance destination of the sheet P.

If a duplex mode for forming an image on the rear surface of the sheet P as well is selected, the paper discharging roller 67 reversely rotates at timing when the sheet P, on the front surface of which the image is formed, is discharged toward the paper discharge tray 68. The conveyance guide 70 switches the conveyance destination to the reversing unit 69. Consequently, the sheet P is switched back and conveyed to the reversing unit 69. The sheet P is fed into the nip of the secondary transfer rollers 64. Further, an image based on image data is formed on the rear surface of the sheet P in the same manner as being formed on the front surface. The sheet P is discharged to the paper discharge tray 68 via the paper discharging roller 67.

The controller 80 controls the operations of the mechanisms explained above. The controller 80 includes a processor such as a CPU (central processing unit) and a memory. The processor executes a computer program stored in the memory, whereby the controller 80 realizes various processing functions. The controller 80 controls the document reading device 10 to thereby acquire an image from a document. The controller 80 controls the image forming units 30, the pickup roller 62, the conveying roller 63, the secondary transfer rollers 64, the fixing unit 65, the conveying roller 66, the paper discharging roller 67, the reversing unit 69, the conveyance guide 70, and the like to thereby form an image on the sheet P. For example, the controller 80 inputs image data read by the document reading device 10 to the image forming unit 30.

Figure 6:
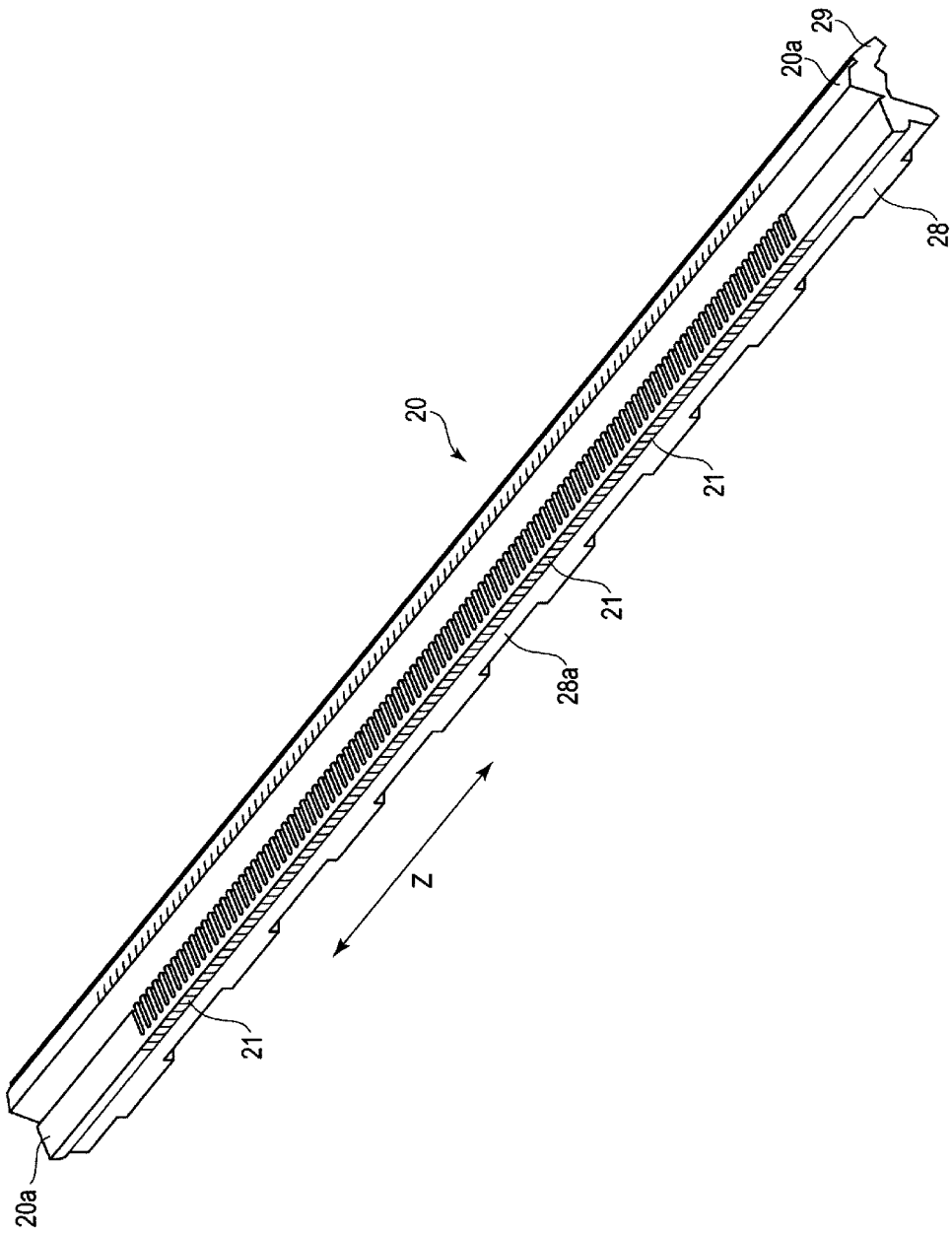
FIG. 6 is an exterior perspective view a lens mirror array illustrated in FIG. 2.
Figure 7:
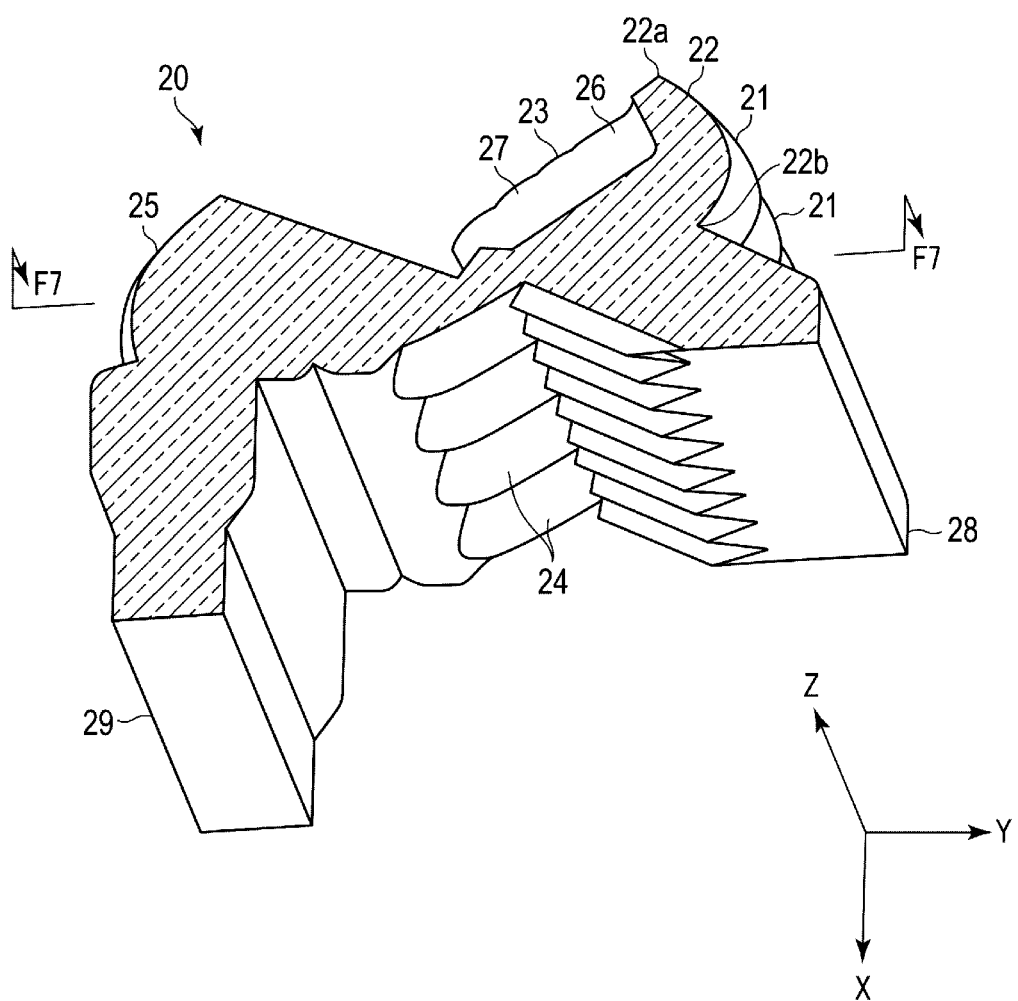
FIG. 7 is a partially enlarged perspective view of the lens mirror array illustrated in FIG. 6.
Figure 8:
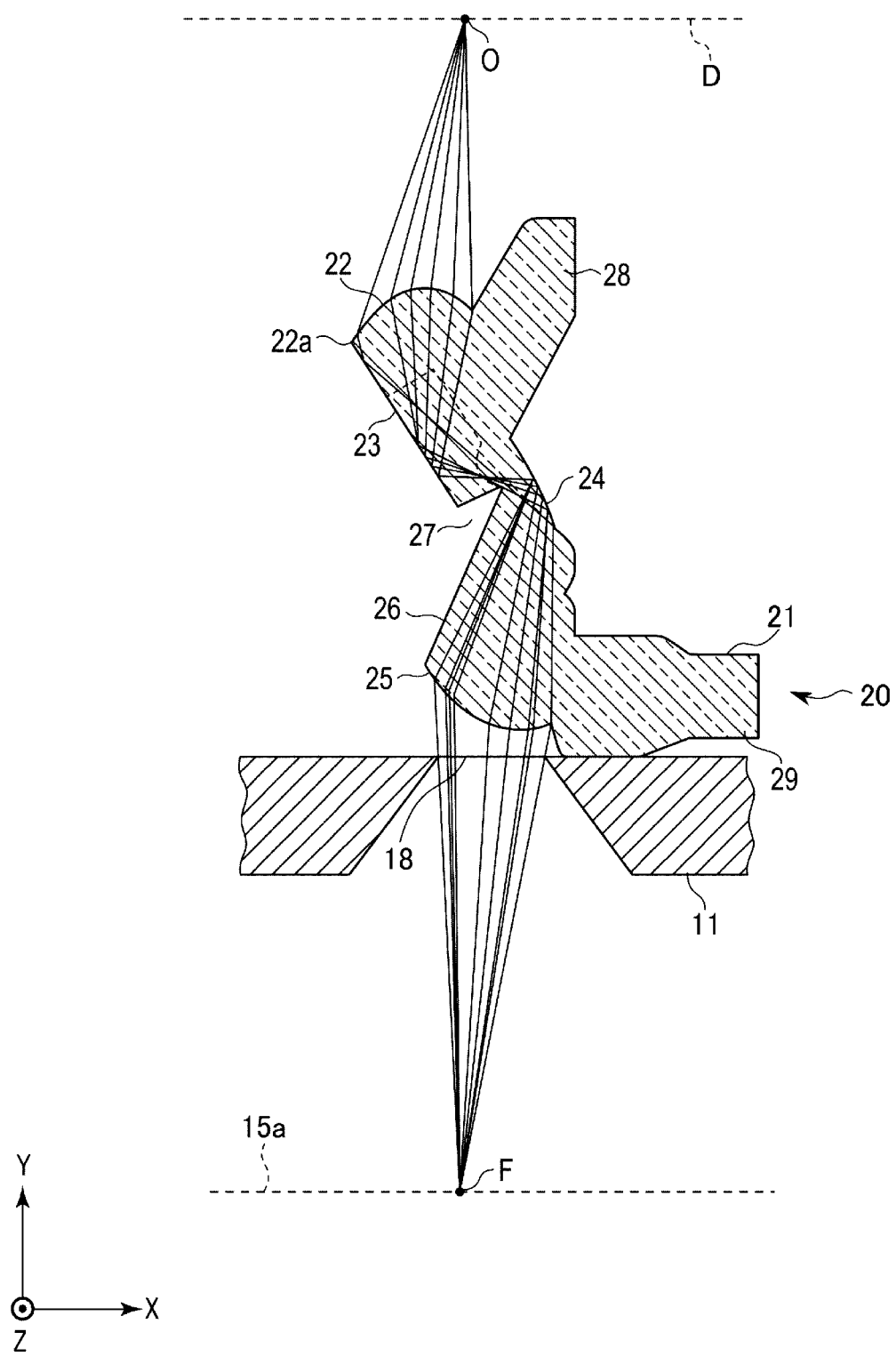
FIG. 8 is a sectional view of the lens mirror array illustrated in FIG. 7.

The lens mirror array 20 described above is explained below with reference to FIGS. 6 to 8. FIG. 6 is an exterior perspective view of the lens mirror array 20. FIG. 7 is a partially enlarged perspective view of the lens mirror array 20. FIG. 8 is a sectional view of the lens mirror array 20 taken along an XY plane passing the center in the Z direction of one optical element 21 of the lens mirror array 20 and orthogonal to the longitudinal direction of the lens mirror array 20. That is, FIG. 8 is an F7-F7 line sectional view. FIG. 8 illustrates an optical path of light passing the lens mirror array 20.

The lens mirror array 20 is incorporated in each of the document reading device 10 and the exposing devices 50Y, 50M, 50C, and 50K of the image forming apparatus 100 in a posture in which the longitudinal direction of the lens mirror array 20 is along the Z direction. The lens mirror array 20 is made of, for example, transparent resin. Alternatively, the lens mirror array 20 may be made of transparent glass or the like. The lens mirror array 20 is integrally formed by, for example, injection molding or 3D (three-dimensional) printing. The lens mirror array 20 has structure in which a plurality of transparent optical elements 21 having the same shape are arranged in the Z direction and integrated. In FIG. 7, only four optical elements 21 are illustrated. The lens mirror array 20 includes flange sections 20a at both ends in the longitudinal direction of the lens mirror array 20 besides the plurality of optical elements 21. In the manufacturing process, a worker grasps the flange sections 20a with fingers or the like. The flange sections 20a are used for, for example, attachment of the lens mirror array 20.

The optical elements 21 of the lens mirror array 20 guide diffused light from an object point O to be focused on an image point F as illustrated in FIG. 8. If the lens mirror array 20 is attached to the document reading device 10 illustrated in FIG. 2, the object point O is present on a document surface D and the image point F is present on the light reception surface 15a of the image sensor 15. If the lens mirror array 20 is attached to the exposing device 50 illustrated in FIG. 4, the object point O is present on a light emission surface 53a of the light source 53 and the image point F is present on the surface 31a of the photoconductive drum 31. FIG. 8 illustrates the lens mirror array 20 attached to the document reading device 10 illustrated in FIG. 2.

Lights from a plurality of object points O present on the document surface D or the light emission surface 53a (hereinafter collectively referred to as light emission surface OP) are incident on one optical element 21. That is, the optical element 21 guides and emits lights incident from the object points O present within a predetermined range of the document surface D or the light emission surface 53a. For example, one optical element 21 guides and emits lights from the object points O disposed in double or triple width of a pitch in the Z direction of the optical element 21. The optical elements 21 of the lens mirror array 20 reflect incident lights twice and emit the light. The optical elements 21 form erected images of the object points O at the image point F with the emitted lights.

For example, if the lens mirror array 20 is incorporated in the document reading device 10 illustrated in FIG. 2, the plurality of optical elements 21 focus reflected light from the document surface on the light reception surface 15a of the image sensor 15. If the lens mirror array 20 is incorporated in the exposing device 50 illustrated in FIG. 4, the plurality of optical elements 21 focus light from the light emission surface 53a on the surface 31a of the photoconductive drum 31. In this case, the light reception surface 15a of the image sensor 15 and the surface 31a of the photoconductive drum 31 function as the image plane FP. The structure and the function of the optical elements 21 are explained below with reference to an example in which the lens mirror array 20 is incorporated in the document reading device 10 illustrated in FIG. 2.

As illustrated in FIGS. 7 and 8, the optical element 21 includes, on the surface of the optical element 21, an incident-side lens surface 22, an upstream-side reflection surface 23, a downstream-side reflection surface 24, and an emission-side lens surface 25. The incident-side lens surface 22, the downstream-side reflection surface 24, and the emission-side lens surface 25 are, for example, surfaces curved to be convex toward the outer side. The upstream-side reflection surface 23 is, for example, a flat surface parallel to the Z direction. A ridge section 22a generally extending along the longitudinal direction of the lens mirror array 20 (i.e., the Z direction) is provided between the incident-side lens surface 22 and the upstream-side reflection surface 23. An imaginary boundary surface between two optical elements 21 adjacent to each other in the Z direction (i.e., the cross section illustrated in FIG. 7) is generally orthogonal to the incident-side lens surface 22, the upstream-side reflection surface 23, the downstream-side reflection surface 24, and the emission-side lens surface 25.

Each of the incident-side lens surface 22, the upstream-side reflection surface 23, the downstream-side reflection surface 24, and the emission-side lens surface 25 generally extends along the longitudinal direction of the lens mirror array 20. That is, in the lens mirror array 20 in which the plurality of optical elements 21 are integrally connected in the longitudinal direction, the incident-side lens surface 22, the upstream-side reflection surface 23, the downstream-side reflection surface 24, and the emission-side lens surface 25 each form a continuous surface in the longitudinal direction. In the lens mirror array 20, the incident-side lens surfaces 22 of the plurality of optical elements 21 are attached in a posture opposed to the document surface D. That is, in the lens mirror array 20, the incident-side lens surfaces 22 of the plurality of optical elements 21 are attached in a posture opposed to the upper surfaces of the document table glass 3 and the reading glass 4.

As illustrated in FIG. 8, when focusing on one optical element 21, diffused light from the document surface D of the original document placed at the object point O is incident on the incident-side lens surface 22. The incident-side lens surface 22 causes the incident diffused light to converge and forms an intermediate inverted image. Therefore, the incident-side lens surface 22 functions as an incident surface that transmits incident light and causes the incident light to converge.

The upstream-side reflection surface 23 continuous to the incident-side lens surface 22 via the ridge section 22a reflects, with total reflection or Fresnel reflection, light made incident via the incident-side lens surface 22 toward the downstream-side reflection surface 24. Therefore, the upstream-side reflection surface 23 functions as the first reflection surface that reflects light made incident via the incident surface.

In order to efficiently capture the light from the document surface D into the optical element 21, it is desirable to dispose the optical element 21 in a direction in which the perpendicular of the document surface D passes the center of the incident-side lens surface 22.

The downstream-side reflection surface 24 further reflects, with total reflection or Fresnel reflection, the light reflected by the upstream-side reflection surface 23 toward the emission-side lens surface 25. The downstream-side reflection surface 24 has power for conjugating the incident-side lens surface 22 and the emission-side lens surface 25, and functions as a relay lens for conjugating the incident-side lens surface 22 and the emission-side lens surface 25. Therefore, the downstream-side reflection surface 24 functions as the second reflection surface that reflects light reflected by the first reflection surface.

The emission-side lens surface 25 emits the light reflected by the downstream-side reflection surface 24 toward the light reception surface 15a of the image sensor 15 disposed at the image point F. The emission-side lens surface 25 is combined with the downstream-side reflection surface 24 and forms, on the light reception surface 15a, an erected image, which is an inverted image of the intermediate inverted image formed by the incident-side lens surface 22. The light emitted from the emission-side lens surface 25 is focused on the light reception surface 15a of the image sensor 15 disposed at the image point F. Therefore, the emission-side lens surface 25 functions as the emission surface that emits light reflected by the second reflection surface.

A light blocking material 26 is applied to a part of the surface of the optical element 21. The light blocking material 26 is applied to the surface of the optical element 21 by a dispenser, an inkjet head, or the like. The light blocking material 26 is, for example, ink having a light blocking property, a base material of which is polymer having the same refractive index or the same degree of a refractive index as the refractive index of the lens mirror array 20. The ink is, for example, UV ink containing a light blocking material such as carbon black, pigment, or dye. The light blocking material 26 prevents light transmitted through the lens mirror array 20 from being reflected and being emitted to the outside of the lens mirror array 20.

In the upstream-side reflection surfaces 23 of the plurality of optical elements 21 adjacent to one another in the longitudinal direction of the lens mirror array 20, end portions on the ridge section 22a sides close to the incident-side lens surfaces 22 are connected flush with one another. In other words, comb teeth-like grooves 27 dividing reflection surfaces are provided between the upstream-side reflection surfaces 23 of the plurality of optical elements 21. The grooves 27 are formed to surround end portions apart from the incident-side lens surfaces 22 of the plurality of upstream-side reflection surfaces 23 and define one ends of the emission-side lens surfaces 25. The grooves 27 are provided around the upstream-side reflection surfaces 23 excluding the ridges 22a.

The light blocking material 26 is applied to the entire surfaces of the comb teeth-like grooves 27. The light blocking material 26 is injected into the grooves 27 by, for example, a dispenser and applied to the inner surfaces of the grooves 27 by the capillary phenomenon of the groves 27, wetting and spreading, or the like. If the light blocking material 26 is applied to the inner surfaces of the grooves 27 using the capillary phenomenon, wetting and spreading, or the like, an appropriate amount of the light blocking material 26 can be continuously and quickly applied by a simple process, and the light blocking material 26 can be uniformly applied to the optical elements 21. In other words, in this embodiment, the light blocking material 26 is not applied to the surface of the lens mirror array 20 other than the grooves 27 (in particular, the upstream-side reflection surface 23).

The lens mirror array 20 includes two flange sections 28 and 29 over the entire length of the lens mirror array 20. Both ends in the longitudinal direction of the flange sections 28 and 29 are included in the flange section 20a explained above. As illustrated in FIG. 7, the flange section 28 on the incident side is provided between the incident-side lens surfaces 22 and the downstream-side reflection surfaces 24 of the plurality of optical elements 21. The flange section 28 on the incident side is projected to the outside from between the plurality of incident-side lens surfaces 22 continuous in the Z direction and the plurality of downstream-side reflection surfaces 24 continuous in the Z direction. The flange section 29 on the emission side is provided between the downstream-side reflection surfaces 24 and the emission-side lens surfaces 25 of the plurality of optical elements 21. The flange section 29 on the emission side is projected to the outside from between the plurality of downstream-side reflection surfaces 24 continuous in the Z direction and the plurality of emission-side lens surfaces 25 continuous in the Z direction. The flange sections 28 and 29 are components for positioning and attachment of the lens mirror array 20.

Figure 9:
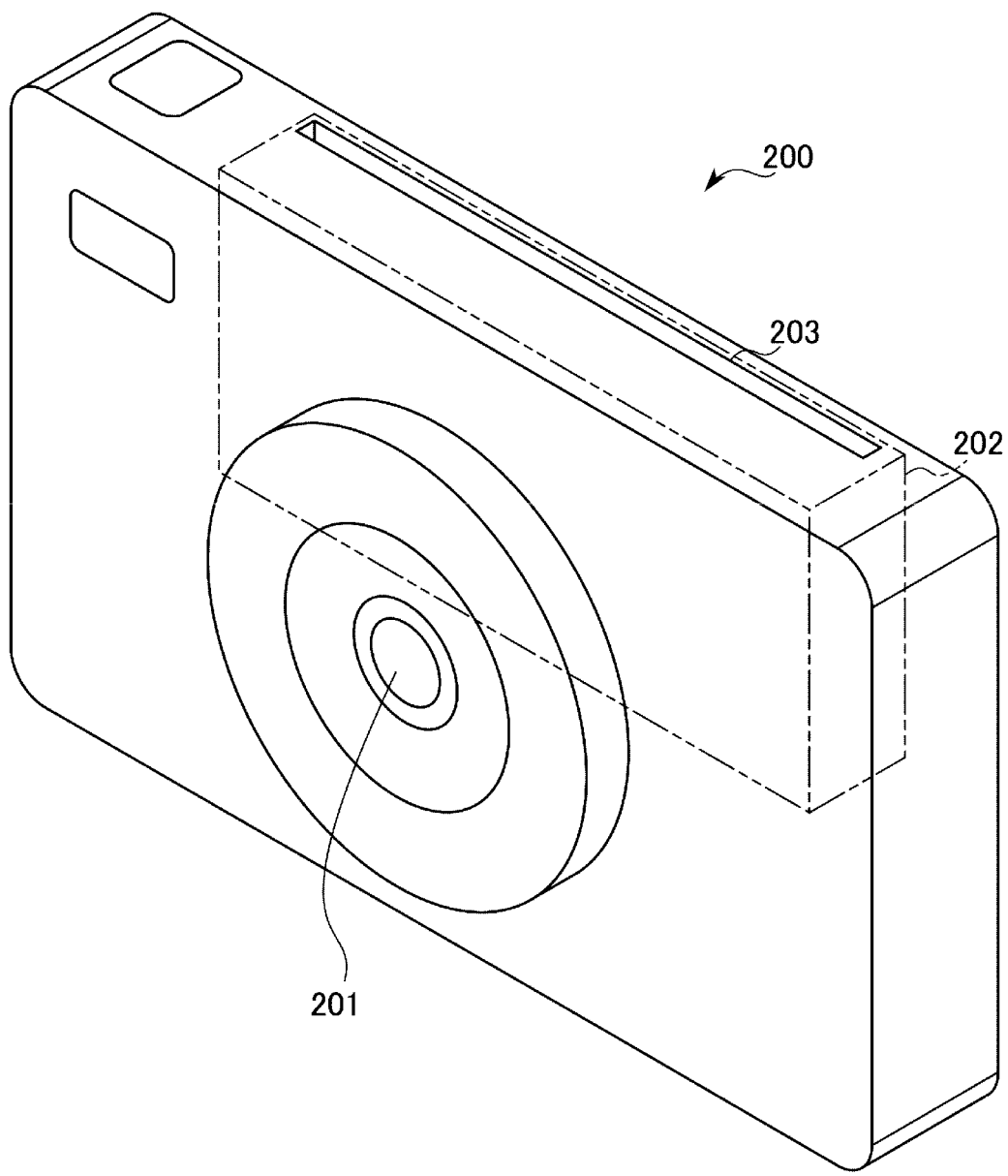
FIG. 9 is a perspective schematic view of an instant camera according to the embodiment.

An instant camera, which is another example of the image forming apparatus 100, is explained with reference to FIG. 9. FIG. 9 is a perspective schematic view of an instant camera 200 according to one embodiment. As an example, the instant camera 200 includes an imaging unit 201 and a printer 202. A hole 203 is opened in the instant camera 200.

The imaging unit 201 is, for example, a digital camera including an optical system including a lens and an image sensor. The imaging unit 201 captures an object image and outputs image data. The image data is input to the printer 202 and printed. The image data may be subjected to various kinds of image processing before being printed by the printer 202. The image data may be input to the printer 202 after being once stored in a storage device such as a memory.

Figure 10:
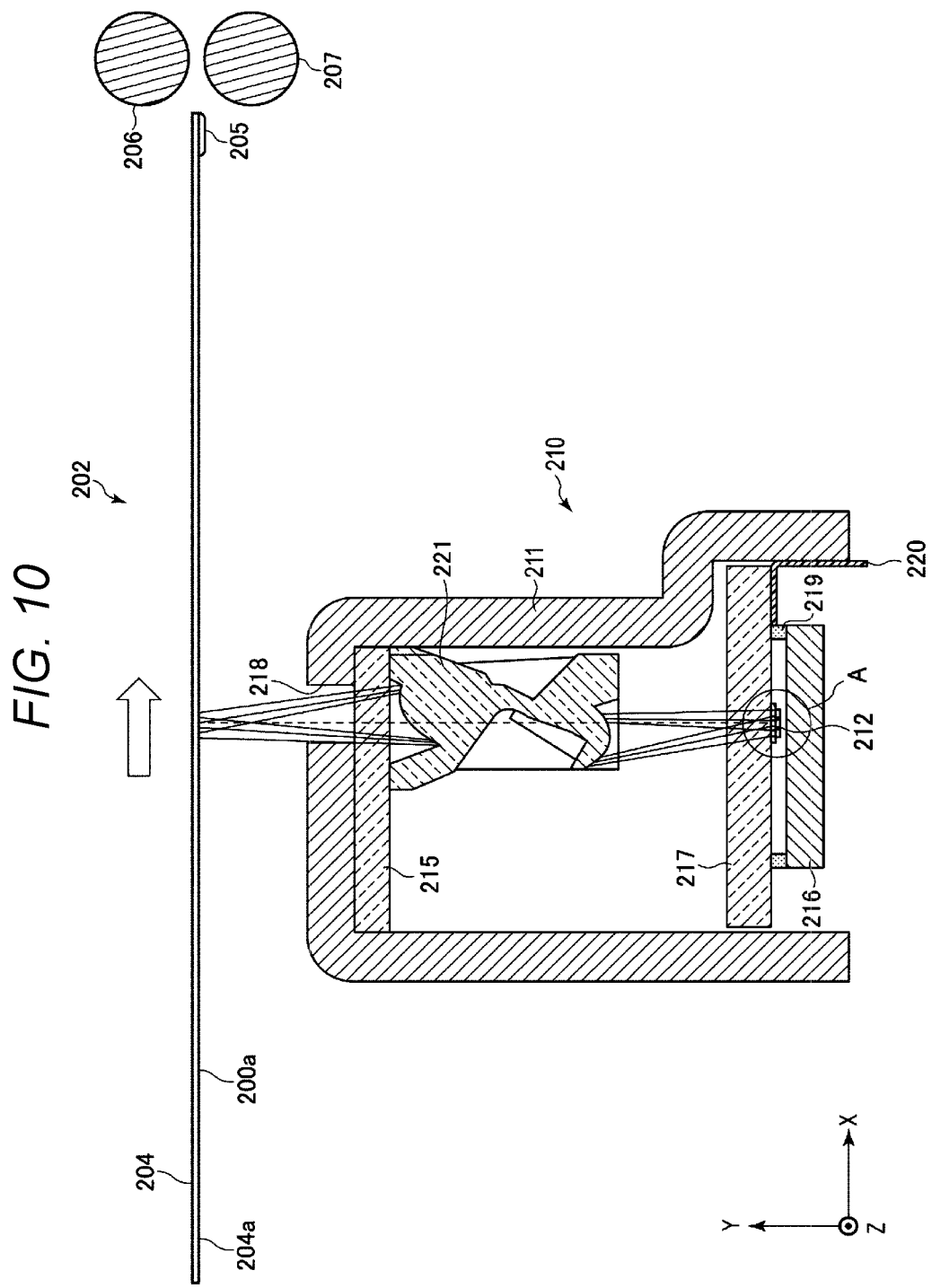
FIG. 10 is a schematic diagram illustrating a printer illustrated in FIG. 9.

The printer 202 is explained with reference to FIG. 10. FIG. 10 is a schematic diagram illustrating a main part of the printer 202. The printer 202 forms, on a photoconductive medium 204, an image based on the image data output by the imaging unit 201.

The photoconductive medium 204 is, for example, a silver salt photograph film. The photoconductive medium 204 is, for example, an instant film.

The printer 202 includes a conveying mechanism that conveys the photoconductive medium 204 in an arrow direction in FIG. 10 (i.e., the right direction in FIG. 10; the X direction). The photoconductive medium 204 is conveyed by a conveying mechanism along a predetermined flat conveyance surface 200a (i.e., the XZ plane). The photoconductive medium 204 includes, on a leading end side in the conveying direction, a storing section 205 in which a developer is stored. A pair of pressing rollers 206 and 207 that holds and presses the photoconductive medium 204 and unseals the storing section 205 is provided on a conveying path of the photoconductive medium 204. The pressing rollers 206 and 207 have length exceeding width in the Z direction orthogonal to the conveying direction of the photoconductive medium 204.

The photoconductive medium 204 is conveyed through between the pressing rollers 206 and 207. At least one of the pressing rollers 206 and 207 is urged in a direction in which the pressing rollers 206 and 207 approach each other. Therefore, the photoconductive medium 204 is conveyed through between the pressing rollers 206 and 207 while being pressed by the pressing rollers 206 and 207. Consequently, the storing section 205 of the photoconductive medium 204 is pressed and unsealed by the pressing rollers 206 and 207. The developer is supplied to the photoconductive medium 204. If the photoconductive medium 204 is further conveyed, the developer spreads over the entire surface of the photoconductive medium 204. Consequently, a color latent image on the photoconductive medium 204 is developed and a color image is formed on the photoconductive medium 204. The photoconductive medium 204 conveyed by the pressing rollers 206 and 207 is discharged from the hole 203 illustrated in FIG. 10.

An exposing device 210 is disposed to be separated from and opposed to the conveying path for conveying the photoconductive medium 204 in a lower part in FIG. 10. The exposing device 210 irradiates exposure lights of three colors (i.e., RGB), which are obtained by color-separating input image data, on a light reception surface 204a of the photoconductive medium 204 conveyed via the conveying path and forms a color latent image on the photoconductive medium 204. The exposing device 210 is disposed on the upstream side of the pressing rollers 206 and 207 along the conveying path.

As an example, the exposing device 210 includes a supporting body 211, a light source 212, a protective glass 215, a sealing plate 216, a transparent glass 217, a slit 218, an adhesive 219, a flexible board 220, and a lens mirror array 221. The exposing device 210 functions as the image forming unit that forms an image on the photoconductive medium 204.

The supporting body 211 is extended in the width direction orthogonal to the conveying direction of the photoconductive medium 204 (i.e., the Z direction orthogonal to the paper surface). The supporting body 211 supports the lens mirror array 221 having the same structure as the structure of the lens mirror array 20. The lens mirror array 221 is extended in the Z direction. The lens mirror array 221 reflects and condenses light made incident from the light source 212 as explained below and emits the light toward the light reception surface 204a of the photoconductive medium 204.

Figure 11:
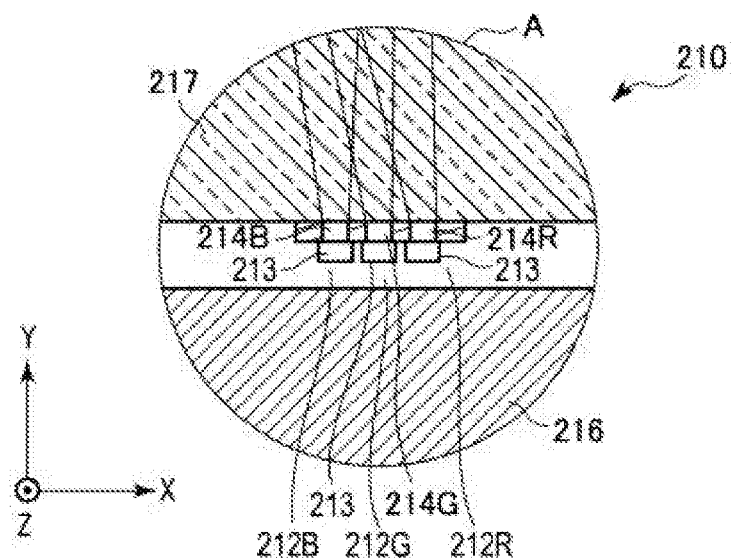
FIG. 11 is a partially enlarged view of a light source illustrated in FIG. 10.

The light source 212 is explained with reference to FIG. 11. FIG. 11 is a partially enlarged view of an area A shown in FIG. 10, including the light source 212 and the periphery of the light source 212.

As an example, the exposing device 210 includes three light sources 212, that is, a light source 212R, a light source 212G, and a light source 212B. The light source 212R, the light source 212G, and the light source 212B are, for example, OLEDs in which filters 214 (i.e., a filter 214R, a filter 214G, and a filter 214B) disposed in zigzag in two rows for each of the colors with respect to a white organic EL element 213 and an aperture are disposed. The light source 212R, the light source 212G, and the light source 212B are arrayed in the Z direction and provided side by side to be separated in the X direction. The white organic EL element 213 is attached to a transparent glass 217.

The light source 212R is a combination of the red filter 214R and the white organic EL element 213. The light source 212G is a combination of the green filter 214G and the white organic EL element 213. The light source 212B is a combination of the blue filter 214B and the white organic EL element 213.

The light sources 212 may be light sources including organic EL elements that emit lights in different colors. The light sources 212 may include light sources other than the OLEDs such as an LEDs.

The OLED is blocked from the outdoor air and prevented from absorbing moisture by the transparent glass 217, the sealing plate 216, and an adhesive 219 provided in a frame shape applied to the outer periphery of the sealing plate 216 to seal a space between the transparent glass 217 and the sealing plate 216. The white organic EL element 213 is connected to the flexible board 220. Power is supplied to the white organic EL element 213 from a circuit on the flexible board 220. The supporting body 211 supports the transparent glass 217 between the lens mirror array 221 and the light sources 212R, 212G, and 212B.

The supporting body 211 supports the transparent protective glass 215 on the photoconductive medium 204 side of the lens mirror array 221. The protective glass 215 protects the lens mirror array 221 and prevents dust from adhering to the lens mirror array 221. One end of the lens mirror array 221 is butted against the protective glass 215 and positioned.

The supporting body 211 includes a slit 218 extending in the Z direction on the light emission side of the protective glass 215. The slit 218 has width for causing a light component necessary for exposure to pass and blocks noise light unnecessary for exposure.

Figure 12:
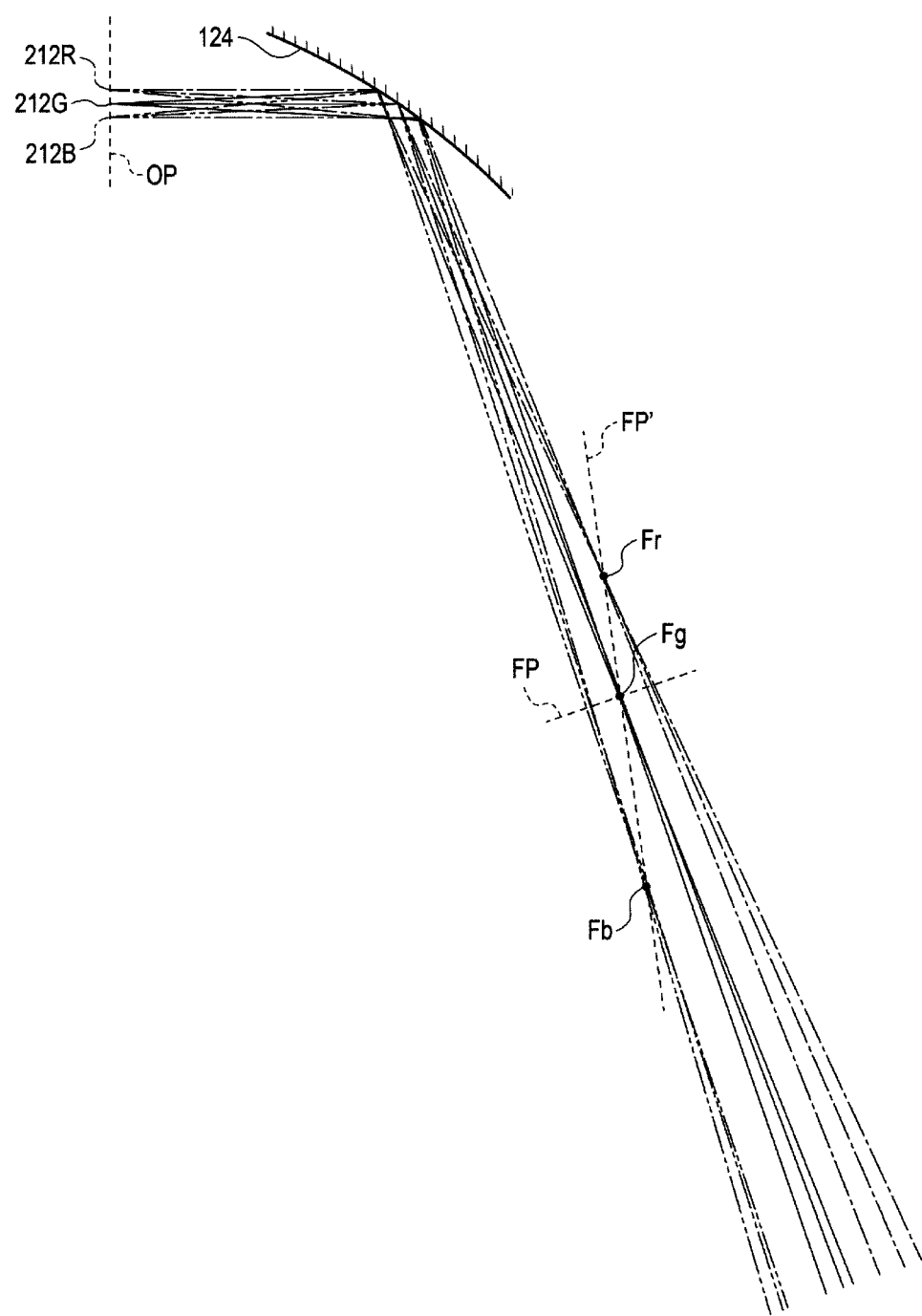
FIG. 12 is a diagram for explaining a light reflection characteristic by a downstream-side reflection surface of an optical element illustrated in FIG. 6.

FIG. 12 is a diagram for explaining a light reflecting and condensing characteristic by the downstream-side reflection surface 24 and the emission-side lens surface 25 of the optical element 21 explained above. To clarify explanation, the light reflecting and condensing characteristic by the downstream-side reflection surface 24 and the emission-side lens surface 25 of one optical element 21 is explained with reference to, as an example, the lens mirror array 221 incorporated in the exposing device 210 of the printer 202 illustrated in FIG. 10. In FIG. 12, an optical path of light guided by the optical element 21 of the actual lens mirror array 221 is simplified. An optical path is illustrated assuming that the downstream-side reflection surface 24 and the emission-side lens surface 25 form one reflection surface 124 and all wavelengths are the same as the wavelength of the light source 212G. The light sources 212R, 212G, and 212B of the colors are regarded as point light sources.

Diffused lights from the light sources 212R, 212G, and 212B are incident on the downstream-side reflection surface 24 having power for conjugating the object point O and the image point F are reflected by the downstream-side reflection surface and condensed by the emission-side lens surface 25. Assuming that all the wavelengths are the same as the wavelength of the light source 212G, the lights condensed by the emission-side lens surface 25 are caused to converge toward image points Fr, Fg, and Fb of the lights. As explained above, the light sources 212R, 212G, and 212B are arrayed side by side to be separated in the X direction. Further, among the light sources 212R, 212G, and 212B, the light source 212R that emits light having the longest wavelength is disposed on a side close to the downstream-side reflection surface 24 and the light source 212B that emits light having the shortest wavelength is disposed on a side far from the downstream-side reflection surface 24. The light source 212G having a wavelength shorter than the wavelength of the light source 212R and longer than the wavelength of the light source 212B is disposed between the light source 212R and the light source 212B. That is, the light sources 212R, 212G, and 212B are disposed such that the distance from the downstream-side reflection surface 24 is longer as the wavelength of light to be emitted is shorter.

It is assumed that a surface FP including an image point Fg of green light from the light source 212G disposed in the center in the X direction is parallel to light emission surfaces OP of the light sources 212R, 212G, and 212B and the wavelengths of the lights emitted by the light sources 212R, 212G, and 212B are the same. In this case, an image point Fr of the light emitted by the light source 212R and an image point Fb of the light emitted by the light source 212B are not focused on the surface FP perpendicular to a main beam emitted from the light source 212G. Specifically, red light emitted from the light source 212R is focused in front of the surface FP and blue light emitted from the light source 212B is focused behind the surface FP and focused on a surface FP'. Here, resin and glass have, for a longer wavelength, a smaller refractive index and less condensing power by the emission-side lens surface 25. Therefore, by disposing the light sources 212R, 212G, and 212B such that the distance from the downstream-side reflection surface 24 is longer as the wavelength of the light to be emitted is shorter, it is possible to generally focus the lights of the colors on the image plane FP. This is because, since the light source 212R has a longer wavelength of light to be emitted compared with the light source 212G, condensing power by the emission-side lens surface 25 decreases and the focusing position Fr shifts to the image plane side. Further, this is because, since the light source 212B has a shorter wavelength of light to be emitted compared with the light source 212G, condensing power by the emission-side lens surface 25 increases and the focusing position Fb shifts to the reflection surface 124 side.

If the lens mirror array 221 explained above is used, by disposing the light sources 212R, 212G, and 212B such that the distance from the downstream-side reflection surface 24 is longer as the wavelength of light to be emitted is shorter, compared with when the light sources 212R, 212G, and 212B are disposed such that the distance from the downstream-side reflection surface 24 is shorter as the wavelength of light to be emitted is shorter, it is possible to increase an effective width in a direction crossing an optical path of light that can be focused on the image plane FP in light made incident via the incident-side lens surface 22 of the optical element 21.

Therefore, according to this embodiment, by disposing the light sources 212R, 212G, and 212B such that the distance from the downstream-side reflection surface 24 is longer as the wavelength of light to be emitted is shorter, it is possible to expand the interval in the X direction of the light sources 212R, 212G, and 212B. Therefore, such disposition can increase flexibility of a layout of the light sources 212R, 212G, and 212B. According to this embodiment, since an effective width of incident light can be increased, it is possible to reduce positioning accuracy along the X direction of the lens mirror array 221. It is possible to roughly perform positioning adjustment along the X direction of the lens mirror array 221.

According to this embodiment, it is possible to obtain a satisfactory beam diameter in a relatively wide range in the X direction on the image plane FP. Therefore, it is possible to roughly perform position adjustment in the X direction of components disposed on the image plane FP. It is possible to increase flexibility of a layout of components on the image plane FP' side.

Since the light sources 212R, 212G, and 212B have a Lambertian light distribution, the light sources 212R, 212G, and 212B emit lights having maximum radiation intensity in the perpendicular direction of the light emission surface OP. Therefore, considering a radiation angle distribution of the light sources 212R, 212G, and 212B, it is desirable to set the light emission surface OP to an angle at which maximum power can be focused on the image plane FP. In this case, it is desirable to dispose the image plane FP to an angle at which an effective width in the X direction of incident light is as large as possible after disposing the light emission surface OP at the angle explained above.

If the lens mirror array 20 is incorporated in the document reading device 10 of the image forming apparatus 100 as illustrated in FIG. 2, as the line sensors 151, the line sensor 151R having sensitivity to the longest wavelength is disposed on the side close to the downstream-side reflection surface 24 and the line sensor 151B having sensitivity to the shortest wavelength is disposed on the side far from the downstream-side reflection surface 24. That is, the line sensors 151R, 151G, and 151B are disposed such that the distance from the downstream-side reflection surface 24 is longer as the wavelength having sensitivity is shorter. The lens mirror array 20 is disposed such that the perpendicular passing the object point O on the document surface D passes the center of the incident-side lens surface 22 of the optical element 21 of the lens mirror array 20.

Consequently, as in the case of the light sources 212R, 212G, and 212B, it is possible to expand the interval in the X direction of the line sensors 151R, 151G, and 151B. Therefore, such disposition can increase flexibility of a layout of the line sensors 151R, 151G, and 151B.

In this case, it is possible to increase the effective width in the X direction of incident light that can be guided by the lens mirror array 20 and focused on the light reception surface 15a of the image sensor 15. It is possible to roughly perform positioning adjustment in the X direction of the lens mirror array 20. In this case, it is possible to increase the width of a spot focused on the light reception surface 15a of the image sensor 15. It is possible to reduce deterioration in an optical characteristic in the X direction.

If the lens mirror array 20 is incorporated in the exposing device 50 as illustrated in FIG. 4, as the light source rows 531, the light source row 531c that emits light having the longest wavelength is disposed on the side close to the downstream-side reflection surface 24 and the light source row 531a that emits light having the shortest wavelength is disposed on the side far from the downstream-side reflection surface 24. That is, the light source rows 531a, 531b, and 531c are disposed such that the distance from the downstream-side reflection surface 24 is longer as the wavelength of light to be emitted is shorter. The lens mirror array 20 is disposed such that the perpendicular passing the object point O present on the light emission surface 53a of the light source 53 passes the center of the incident-side lens surface 22 of the optical element 21 of the lens mirror array 20.

Consequently, as in the case of the light sources 212R, 212G, and 212B, it is possible to expand the interval in the X direction of the light source rows 531a, 531b, and 531c. Therefore, such disposition can increase flexibility of a layout of the line sensors 151R, 151G, and 151B. The photoconductive drum 31 is unrelated to a color of an image even if the wavelength of incident light is changed. However, it is desirable to set the wavelength of light emitted by the light source 53 to an optimum wavelength in order to increase the effective width.

In this case, it is possible to increase the effective width in the X direction of incident light that can be guided by the lens mirror array 20 and focused on the surface 31a of the photoconductive drum 31. It is possible to roughly perform positioning adjustment in the X direction of the lens mirror array 20. In this case, it is possible to increase the width of focusing on the surface 31a of the photoconductive drum 31. It is possible to reduce deterioration in an optical characteristic in the X direction.

Modifications explained below of the embodiment are also possible.

In one embodiment, the lens mirror array 20 includes the two reflection surfaces, that is, the upstream-side reflection surface 23 and the downstream-side reflection surface 24. However, the lens mirror array may include three or more reflection surfaces including a reflection surface other than the upstream-side reflection surface 23 and the downstream-side reflection surface 24.

The image forming apparatus may be a printer, a facsimile, or the like.

The image sensor 15 may convert strength and weakness of light having a complementary color of a primary color into a signal.

The line sensors 151 may be line sensors of four or more colors.

The number of the light source rows 531 may be two or four or more.

The light sources 212 may be light sources of two colors or four or more colors.

The printer 202 may not be incorporated in the instant camera. In this case, the printer 202 acquires image data from an external device such as a smartphone, a PC, or a digital camera connected by wire or radio or a removable storage medium such as a memory card or a USB (universal serial bus) memory. The printer 202 prints an image based on the image data on the photoconductive medium 204. In this case, the printer 202 is an example of the image forming apparatus.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An optical device comprising:
    a plurality of light sources each configured to emit light having a different wavelength; and
    a lens mirror array having a plurality of optical elements, each of the plurality of optical elements including:
        an incident surface through which light emitted from each light source enters the optical element,
        a first reflection surface from which the light incident on the incident surface is reflected,
        a second reflection surface from which the light reflected by the first reflection surface is further reflected, and
        an emission surface through which the light reflected by the second reflection surface exits the optical element, wherein
    the plurality of light sources is arranged such that a light source that emits light having a shorter wavelength is disposed farther from the second reflection surface of one of the optical elements.

2. The device according to claim 1, wherein the incident surface causes the incident light to converge.

3. The device according to claim 1, wherein the second reflection surface causes the light reflected by the first reflection surface to converge.

4. The device according to claim 1, wherein the emission surface causes the light reflected by the second reflection surface to be focused on an image plane.

5. The device according to claim 1, wherein the optical elements are arranged adjacent to each other in a longitudinal direction of the lens mirror array.

6. The device according to claim 5, wherein the light sources include a plurality of groups of light elements, and the light elements of each group are arranged in parallel along the longitudinal direction of the lens mirror array.

7. The device according to claim 6, wherein each of the light element is an OLED.

8. The device according to claim 7, wherein the OLED comprises a color filter and a white OLED element.

9. The device according to claim 1, wherein a groove is formed between two of the optical elements that are adjacent to each other so that the first reflection surface of each of the optical elements is separated.

10. The device according to claim 9, wherein a light blocking material is applied to an entire surface of the groove.

11. An optical device comprising:
    a lens mirror array having a plurality of optical elements, each of the plurality of optical elements including:
        an incident surface through which light emitted from a light source enters the optical element,
        a first reflection surface from which the light incident on the incident surface is reflected,
        a second reflection surface from which the light reflected by the first reflection surface is further reflected, and
        an emission surface through which the light reflected by the second reflection surface exits the optical element; and
    a plurality of optical sensors on which the light emitted from the emission surface is incident, wherein
    the plurality of optical sensors is arranged such that an optical sensor that receives light having a shorter wavelength is disposed farther from the second reflection surface of one of the optical elements.

12. The device according to claim 11, wherein the incident surface causes the incident light to converge.

13. The device according to claim 11, wherein the second reflection surface causes the light reflected by the first reflection surface to converge.

14. The device according to claim 11, wherein the emission surface causes the light reflected by the second reflection surface to be focused on an image plane.

15. The device according to claim 11, wherein the optical elements are arranged adjacent to each other in a longitudinal direction of the lens mirror array.

16. The device according to claim 11, wherein a groove is formed between two of the optical elements that are adjacent to each other so that the first reflection surface of each of the optical elements is separated.

17. The device according to claim 16, wherein a light blocking material is applied to an entire surface of the groove.

18. An image forming apparatus comprising:
an optical device comprising
- a plurality of light sources each configured to emit light having a different wavelength, and
- a lens mirror array having a plurality of optical elements, each of the plurality of optical elements including:
  - an incident surface through which the light emitted from each light source enters the optical element,
  - a first reflection surface from which the light incident on the incident surface is reflected,
  - a second reflection surface from which the light reflected by the first reflection surface is further reflected, and
  - an emission surface through which the light reflected by the second reflection surface exits the optical element, wherein
  the plurality of light sources is arranged such that a light source that emits light having a shorter wavelength is disposed farther from the second reflection surface of one of the optical elements; and
an image forming unit configured to form an image using the light emitted from the emission surface.

19. The apparatus according to claim 18, wherein the image forming unit forms the image on a photoconductive medium by exposing the photoconductive medium with the light emitted from the emission surface.

20. The apparatus according to claim 18, further comprising:
an imaging unit configured to capture an image of an object and output data of the image, wherein
the image forming unit forms the image on a photoconductive medium based on the output data of the image.

* * * * *